United States Patent
Gansohr et al.

(10) Patent No.: US 9,644,733 B2
(45) Date of Patent: May 9, 2017

(54) METHOD FOR DETERMINATION OF AT LEAST A DRAG TORQUE EFFECTIVE ON THE INPUT SIDE OF AN AUTOMATIC MOTOR VEHICLE TRANSMISSION

(71) Applicant: ZF Friedrichshafen AG, Friedrichshafen (DE)

(72) Inventors: Marcus Gansohr, Salem (DE); Benjamin Berger, Markdorf (DE); Florian Schneider, Lindenberg im Allgau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/302,458

(22) Filed: Jun. 12, 2014

(65) Prior Publication Data

US 2015/0046048 A1 Feb. 12, 2015

(30) Foreign Application Priority Data

Aug. 7, 2013 (DE) .......................... 10 2013 215 497

(51) Int. Cl.
*F16H 61/02* (2006.01)
*B60W 30/19* (2012.01)
(Continued)

(52) U.S. Cl.
CPC ... *F16H 61/0202* (2013.01); *B60W 30/18054* (2013.01); *B60W 40/13* (2013.01);
(Continued)

(58) Field of Classification Search
CPC ... F16D 2500/30417; F16D 2500/3068; F16D 2500/30818; F16D 2500/5029; F16D 2500/70605; F16D 2500/3165
See application file for complete search history.

(56) References Cited

U.S. PATENT DOCUMENTS 8,105,205 B2 * 1/2012 Reuschel ...................... 477/181
2010/0012052 A1 * 1/2010 Anz et al. ......................... 123/2

FOREIGN PATENT DOCUMENTS

DE 10 2009 057 233 A1 6/2011
DE 10 2011 011 921 A1 9/2011
(Continued)

OTHER PUBLICATIONS

German Search Report Corresponding to 10 2013 215 497.6 mailed Mar. 5, 2014.

*Primary Examiner* — Ramya Burgess
*Assistant Examiner* — David Morris
(74) *Attorney, Agent, or Firm* — Davis & Bujold, PLLC; Michael J. Bujold

(57) ABSTRACT

A method of determining at least one drag torque acting on the input side of an automatic transmission, such that prior to the determination a separator clutch located between the transmission and an engine is disengaged. To be able to carry out the determination regardless of the type of transmission concerned, also prior to the determination, the transmission is shifted to neutral and subsequently the drag torque is calculated when the engine is deactivated. For this, a first gradient of a transmission input rotational speed is determined, before an engine rotational speed of the engine falls below the transmission input rotational speed, and a second gradient of the transmission input rotational speed is determined, after the engine rotational speed falls below the transmission input rotational speed. The method is stored as a computer program stored on data carrier of a drive-train control unit of a motor vehicle.

6 Claims, 2 Drawing Sheets

(51) Int. Cl.
*B60W 40/13* (2012.01)
*B60W 30/18* (2012.01)
*B60W 50/00* (2006.01)

(52) U.S. Cl.
CPC ..... *B60W 30/19* (2013.01); *B60W 2040/1353* (2013.01); *B60W 2050/0083* (2013.01); *B60W 2510/102* (2013.01)

(56) References Cited

FOREIGN PATENT DOCUMENTS

| DE | 10 2010 039 642 A1 | 2/2012 |
| DE | 10 2011 016 576 A1 | 10/2012 |
| EP | 1 067 008 A2 | 1/2001 |
| EP | 1 741 950 A1 | 1/2007 |

* cited by examiner

METHOD FOR DETERMINATION OF AT LEAST A DRAG TORQUE EFFECTIVE ON THE INPUT SIDE OF AN AUTOMATIC MOTOR VEHICLE TRANSMISSION

This application claims priority from German patent application serial no. 10 2013 215 497.6 filed Aug. 7, 2013.

FIELD OF THE INVENTION

The invention concerns a method for determination of at least a drag torque acting on the input side of an automatic motor vehicle transmission, wherein, in advance of the determination a separator clutch located between the motor vehicle transmission and a drive engine is opened. Furthermore, the invention concerns a drive-train of a motor vehicle, a computer program product and a data carrier comprising the computer program product.

BACKGROUND OF THE INVENTION

The determination of losses on the transmission input side, particularly in the case of automatic motor vehicle transmissions having unsynchronized interlocking shifting elements, is of interest since in these, to carry out shifting operations rotational speeds in the area of the unsynchronized shifting element concerned must be synchronized at least as much as possible, so that when the shifting element is actuated an interlocked coupling of corresponding transmission components can be formed in as problem-free a manner as possible. The more accurately drag torques in the area of the transmission input are known in such cases, the more precisely a transmission control unit can adjust the respective rotational speed relationships. Consequently, by determining drag torques in the area on the drive input side the comfort when carrying out shifting operations that involve unsynchronized shifting elements can be improved substantially.

DE 10 2011 016 576 A1 describes a method for determining drag torques of two friction clutches which, being combined in a dual clutch, are each part of a dual-clutch transmission. In this case each friction clutch is associated with one of the downstream partial transmissions. In the method the drag torque of the clutch of whichever partial transmission is operating passively can be determined during operation, while the friction clutch of the respective partial transmission that is operating actively is operated with a controlled amount of slip.

SUMMARY OF THE INVENTION

Starting from the prior art described above, the purpose of the present invention is now to provide a method for determining at least one drag torque acting on the input side of an automatic motor vehicle transmission, this determination being possible regardless of the type of transmission concerned.

This objective is achieved from the process technology standpoint in combination with the characterizing features described below. In the context of a drive-train comprising an automatic motor vehicle transmission the objective is achieved by the technical principles described below. A computer program product and a storage medium that contains it are also described below.

According to the invention, in a method for determining at least a drag torque acting on the input side of an automatic motor vehicle transmission, prior to the determination, a separator clutch located between the motor vehicle transmission and a drive engine is opened. The automatic motor vehicle transmission is preferably an automated manual transmission comprising unsynchronized interlocking shifting elements such as claw clutches. By virtue of a knowledge of the drag torque or torques acting on the drive input side, a transmission control unit can carry out a more precise adjustment of synchronous rotational speeds in the area of the shifting element concerned, so that shifting operations in the transmission can be carried out more comfortably. In principle, however, the automatic motor vehicle transmission could be a transmission designed in some other way, such as a dual-clutch transmission, etc. Furthermore the motor vehicle transmission can be designed with a group configuration in which a splitter group is connected upstream or downstream from a main group and/or a range group is connected downstream from the main group.

Now, the invention brings into play the technical principle that in advance of the determination, the motor vehicle transmission is in addition shifted to neutral and thereafter the at least one drag torque is calculated during a deactivation of the drive engine. For the calculation, to begin with a first gradient of a transmission input rotational speed is determined before the rotational speed of a drive engine falls below the transmission input rotational speed, and thereafter, when the engine rotational speed has fallen below the transmission input rotational speed, a second gradient of the transmission input rotational speed is determined.

In other words, therefore, to determine the at least one drag torque the motor vehicle transmission is shifted to neutral and the at least one drag torque is determined while the drive engine is being stopped. In this case two input rotational speed gradients of the motor vehicle transmission are determined, the first gradient being measured while the engine rotational speed of the drive engine is higher compared with the transmission input rotational speed whereas the second gradient is determined after the engine rotational speed has fallen below the transmission input rotational speed.

Such a method has the advantage that on the basis of the two gradients determined the at least one drag torque acting on the input side can be calculated, and this can be done regardless of the type of transmission concerned in each case. This is because when the separator clutch is open and the motor vehicle transmission is shifted to neutral, a sum of the effective drag torques and a respective angular acceleration can be calculated with reference to the mass moment of inertia of the part of the transmission on the drive input side. In this case the drag torques acting on the input side are, on the one hand, a drag torque of the separator clutch and, on the other hand, a drag torque of that part of the motor vehicle transmission shifted to neutral, which is on the input side. To begin with the individual drag torques cannot in this case be determined from that equation, since although it is true that the mass moment of inertia, being a design magnitude, is known and the angular acceleration can be determined with reference to the rotational speed measured by sensors, the one equation contains two unknowns.

Now, however, this problem can be solved by determining rotational speed gradients of the transmission input rotational speed of the transmission before and after the engine rotational speed falls below the transmission input rotational speed, since the effect of the drag torque of the separator clutch is reversed between those two conditions. This is because whereas a drag torque of the motor vehicle transmission always causes a reduction of the transmission input rotational speed of the transmission, when the engine rotational speed is above the transmission input rotational speed, the drag torque of the separator clutch acts to accelerate the transmission input, while from the time when the engine rotational speed falls below the transmission input rotational speed a decelerating influence is exerted upon the transmission input. Consequently the following two equations can now be written:

$$M_{Getr} + M_{Kup1} = J_{Getr} \cdot \omega_{Getr,I}$$

$$M_{Getr} + M_{Kup2} = J_{Getr} \cdot \omega_{Getr,II}$$

According to the invention, it is also assumed that a drag torque of the separator clutch before the falling-below corresponds to a drag torque after it, which is numerically the same but of opposite sign. In other words, it is assumed that a separator clutch drag torque before the engine rotational speed falls below the transmission input rotational speed corresponds to the negative of a drag torque of the separator clutch after that has happened:

$$M_{Kup1} = -M_{Kup2}$$

Consequently, the individual drag torques can be determined from the two equations available. To be specific, the drag torque of the separator clutch and/or the drag torque of the drive input section of the motor vehicle transmission shifted to neutral can be determined.

The assumption made about the drag torques of the separator clutch is quite realistic, particularly in the case of a separator clutch in the form of a dry-running friction clutch in which the drag torques before and after the rotational speed value reversal are numerically substantially the same. These drag torques, which can also be called residual transmission torques, occur because even when the separator clutch is fully open a certain amount of torque is transmitted, which is caused by aerodynamic effects and also by wobbling movements which, despite the open condition of the clutch, result in some frictional contact between the halves of the clutch.

To determine the relevant drag torques in the area of the unsynchronized shifting element or shifting elements, the motor vehicle transmission must be in neutral so that when determining a drag torque of the part of the motor vehicle transmission on the drive input side, the relevant drag torque acting up to that point can be calculated. Thus, in automatic motor vehicle transmissions of group configuration a neutral position should be set in the transmission group that contains the unsynchronized shifting elements.

In contrast to the method according to the present invention, the determination method described in DE 10 2011 016 576 A1 can only be carried out with a dual-clutch transmission, since for the determination it requires a passively operating partial transmission and an actively operating partial transmission. Accordingly, that method cannot be used generally with automatic motor vehicle transmissions of any type.

As a further development of the invention, the drag torque determined for the drive input side part of the motor vehicle transmission in neutral is recorded as a function of a current transmission temperature. In other words, when a drag torque is calculated for the input-side part of the motor vehicle transmission by means of the method according to the invention, the calculation result is associated with the transmission temperature at the time since there is a relationship between the transmission drag torque and the transmission temperature. Thereafter, thanks to this relation, with regard to the transmission temperature existing at the time, the transmission control unit can call up the corresponding current transmission drag torque. It may also be possible to interpolate between drag torques determined for different temperatures.

According to a further embodiment of the invention, the drag torque determined for the drive input side part of the motor vehicle transmission in neutral is recorded as a function of a current road inclination. A separator clutch drag torque depends on road inclination because some components in the drive-train, for example the crankshaft of the drive engine, are fitted with a certain amount of axial play, so that if the road is inclined the axial distance apart from one another of the clutch halves of the separator clutch can be different from their distance apart on a level road. Consequently, wobbling movements and aerodynamic effects act in a more pronounced or less pronounced manner than on a level stretch or when the road inclination is different. If this is taken into account when calculating the drag torque, then the value corresponding to the road inclination concerned can thereafter be called up. It may also be possible to interpolate between drag torques determined for different road inclinations A further feature of the invention is that in advance of the determination, the motor vehicle transmission is first shifted to neutral, and the separator clutch is opened as soon as the deactivation of the drive engine is initiated. This ensures that at the beginning of the measurement the transmission input rotational speed has not already decreased to such an extent that the engine rotational speed can no longer fall below it. Since the transmission is first shifted to neutral, until the separator clutch is opened the transmission input still rotates at the engine rotational speed. Thereafter, the clutch is only opened when the drive engine is switched off, this in particular being indicated with reference to a drive engine ignition signal.

In a further development of the invention, the determination is carried out during the course of parking the motor vehicle concerned. In this way, the driving comfort is not impaired by the operating sequence of the method according to the invention, since the drive engine does not have to be deactivated while driving is in progress, but rather, the method according to the invention, is carried out during the stopping of the motor vehicle in a manner that is not, or only hardly noticeable by the driver of the vehicle, at a time when the drive engine has to be deactivated in any case. However, in order then to have the torque values determined available for future operation, the at least one drag torque determined is stored in a non-volatile memory. Consequently, an already determined drag torque of the separator clutch and/or a drag torque of the input-side part of the motor vehicle transmission can be used for subsequent operation in the context of shifting processes.

The system according to the invention can also be embodied as a computer program product which, when it is run in a processor of a transmission control unit, commands the processor by software means to carry out the associated steps of the method that is the object of this invention. In this connection a computer-readable medium, on which a computer program product is stored in a retrievable manner, is also part of the object of the invention.

The invention is not limited to the combination of characteristics indicated in the associated claims or the claims that depend on them. It is also possible to combine individual characteristics with one another, insofar as they emerge from the claims, the description of an embodiment given below, or directly from the figures. The reference of the claims to the figures by the use of indexes is not intended to restrict the protective scope of the claims.

BRIEF DESCRIPTION OF THE DRAWINGS

An advantageous embodiment of the invention, which will be explained below, is represented in the figures, which show.

DETAILED DESCRIPTION OF THE PREFERRED EMBODIMENTS

Figure 1:
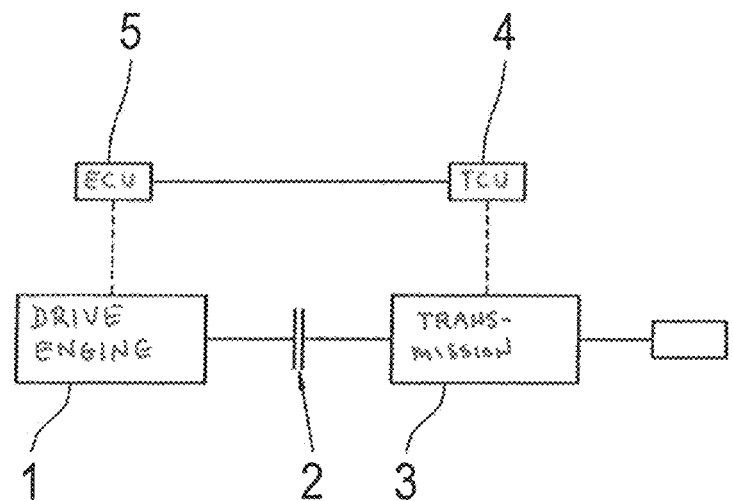
FIG. 1: A schematic representation of a drive-train of a motor vehicle.

FIG. 1 shows a schematic representation of a drive-train of a motor vehicle, the motor vehicle being a commercial vehicle such as a truck. Within the drive-train a drive engine 1 in the form of an internal combustion engine can be connected on its drive output side, by way of an interposed separator clutch 2, to a downstream motor vehicle transmission 3. In this case the motor vehicle transmission 3 is designed in the form of an automated group transmission in which—not represented in any greater detail here—a splitter group is connected upstream or downstream from a main group and/or a range group is connected downstream from the main group. Gear steps in the main group of the motor vehicle transmission 3 can be engaged individually by means of unsynchronized interlocking shifting elements in the form of claw clutches, and for that purpose a rotational speed equalization has to be carried out in the area of the shifting element concerned in each case, between the clutch halves to be coupled with one another with interlock.

During the corresponding shifting operations in the main group the rotational speed equalization is regulated by a transmission control unit 4, which before a shift to a respective next gear carries out the necessary equalization by braking or accelerating the drive input side part of the motor vehicle transmission 3 shifted to neutral. For such braking, the transmission control unit 4 can use a transmission brake—also not shown in this case—whereas an acceleration is carried out by means of the drive engine 1 in combination with the separator clutch 2. For that purpose, during the shifting processes the transmission control unit 4 can issue control commands to an engine control unit 5 of the drive engine 1 and can also regulate the opening and closing of the separator clutch 2.

Figure 2:
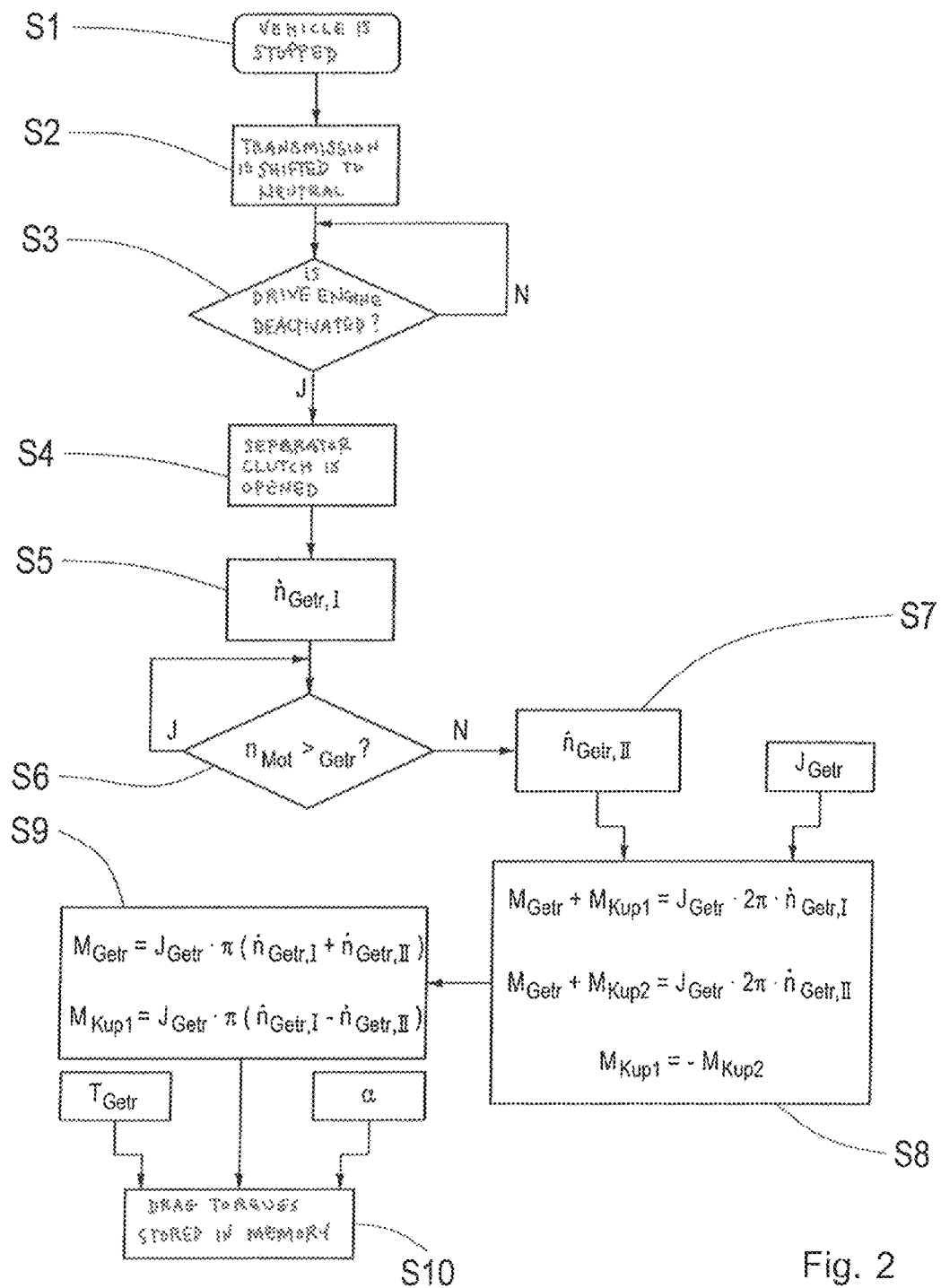
FIG. 2: An operating sequence diagram of a method according to the invention that corresponds to a preferred embodiment of the invention.

However, to be able to adjust the corresponding synchronous rotational speeds with precision, in the transmission control unit 4 drag torques $M_{Getr}$ and $M_{Kup1}$ that act on the transmission input side are stored, which have to be taken into account appropriately when regulating the rotational speed concerned by means of a transmission brake or by the drive engine 1. These drag torques $M_{Getr}$ and $M_{Kup1}$, of which the drag torque $M_{Getr}$ is that of the input side of the motor vehicle transmission 3 in neutral whereas the drag torque $M_{Kup1}$ is a residual transmission torque of the separator clutch 2, will have been determined in advance while the motor vehicle having this drive-train was being stopped in the context of a procedure according to the invention, which will now be described in more detail in the flowchart of FIG. 2 with reference to the chart in FIG. 3.

The method according to the invention is initiated in a step S1 when it is recognized that the commercial vehicle has stopped, for example because the vehicle is at rest and the driver has performed corresponding actions from which that process can be inferred. In a step S2 which, however, can also be part of the recognition that the vehicle has stopped, the motor vehicle transmission is shifted to neutral in that in the unsynchronized main group, the claw clutch which until then was still engaging an associated gear step, is opened. At this point in time, since the separator clutch 2 is still closed an engine rotational speed $n_{Mot}$ and a transmission input rotational speed $n_{Getr}$ are equal, as can be seen in the initial portion of FIG. 3.

In a subsequent step S3 it is then checked whether the drive engine 1 is being deactivated, and for the recognition of that process the transmission control unit 4 checks an ignition signal from the engine control unit 5. If this is not the case the system springs back to before step S3 and a new check is started, whereas if it is indeed the case, in step S4 the separator clutch 2 is opened. Since the transmission input has now been separated from the drive engine 1, the drag torques $M_{Getr}$ and $M_{Kup1}$ acting on the drive input side part of the motor vehicle transmission 3 bring about a fall of the transmission input rotational speed $n_{Getr}$.

Figure 3:
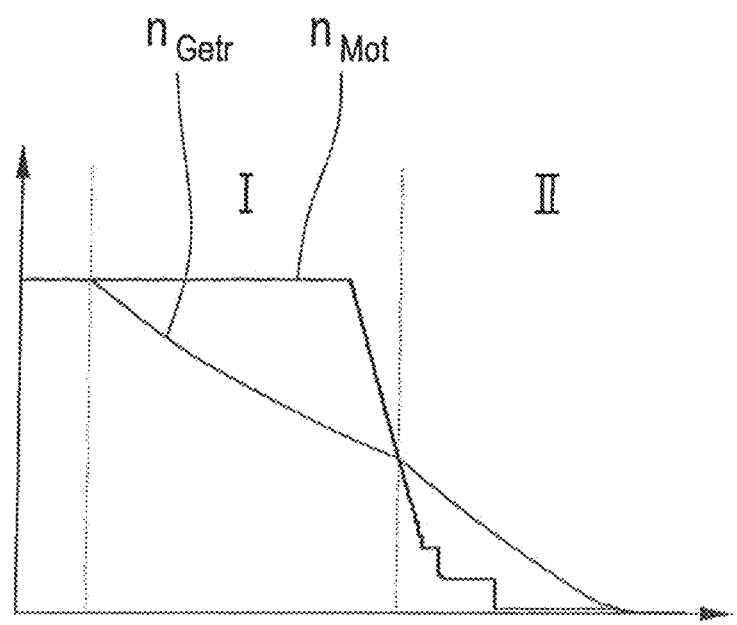
FIG. 3: A diagram in which rotational speed variations as a function of time during the course of the method are plotted.

As can be seen in FIG. 3 by following the time variations of the transmission input rotational speed $n_{Getr}$ and of the engine rotational speed within a zone I the transmission input rotational speed $n_{Getr}$ is lower than the engine rotational speed $n_{Mot}$. The result of this is that the drag torques $M_{Getr}$ and $M_{Kup1}$ act in opposition to one another, since the drag torque $M_{Getr}$ of the transmission input side part of the motor vehicle transmission 3 acts to reduce the rotational speed, whereas in contrast the drag torque $M_{Kup1}$ of the clutch 2, originating in aerodynamic effects and wobbling movements and which is therefore the result of a latent connection of the transmission input to the drive engine 1, is trying to increase the rotational speed of the transmission input. This interplay of the two drag torques $M_{Getr}$ and $M_{Kup1}$ brings about a certain reduction of the transmission input rotational speed $n_{Getr}$, which is determined in step S5 with reference to a measurement of the gradient $\dot{n}_{Getr, I}$.

In a subsequent step S6 the transmission control unit 4 checks whether the engine rotational speed $n_{Mot}$ is still higher than the transmission input rotational speed $n_{Getr}$, i.e. whether the condition corresponding to zone I in FIG. 3 still prevails. If so, the system springs back to before step S6 and a new check is started. On the other hand, if it is recognized that the engine rotational speed $n_{Mot}$ has already fallen below the transmission input rotational speed $n_{Getr}$, a situation represented in FIG. 3 by the zone II, then the system advances to step S7.

In zone II, compared with zone I the conditions have changed to the effect that owing to the now lower rotational speed of the drive engine 1, a drag torque $M_{Kup2}$ of the separator clutch 2 also acts to slow down the transmission input. In step S7 a gradient $\dot{n}_{Getr, II}$ of the transmission input rotational speed $n_{Getr}$ is now also determined for zone II, which is different from the first gradient $\dot{n}_{Get, I}$ on account of the changed interplay of the drag torque $M_{Getr}$ of the motor vehicle transmission 3 and the drag torque $M_{Kup2}$ of the separator clutch 2.

After step S7, in the following steps S8 and S9 the relevant drag torques $M_{Kup1}$ and $M_{Getr}$ are determined by writing the equations:

$$M_{Getr}+M_{Kup1}=J_{Getr}\cdot 2\pi \cdot \dot{n}_{Getr,I}$$

$$M_{Getr}+M_{Kup2}=J_{Getr}\cdot 2\pi \cdot \dot{n}_{Getr,II}$$

in which the measured gradients $\dot{n}_{Getr, I}$ and $\dot{n}_{Getr, II}$ are used. In addition a mass moment of inertia $J_{Getr}$ of the drive input side part of the motor vehicle transmission 3 shifted to neutral, which is stored in the transmission control unit 4, is also included. To be able to solve the equations, in step S8 the assumption is also made that:

$$M_{Kup1} = -M_{Kup2},$$

so that in step S9, finally, for the determination of the drag torques $M_{Kup1}$ and $_{Mgetr}$ the equations:

$$M_{Getr} = J_{Getr} \cdot \pi \cdot (n_{Getr,I} + n_{Getr,II})$$

$$M_{Getr} = J_{Getr} \cdot \pi \cdot (\dot{n}_{Getr,I} - \dot{n}_{Getr,II})$$

can be formulated.

In a subsequent step S10 the two drag torques $M_{Kup1}$ and $M_{Getr}$ are then stored in a non-volatile memory of the transmission control unit 4, wherein the drag torque $M_{Kup1}$ of the separator clutch 2 is stored as a function of a current road inclination $\alpha$, whereas the drag torque of the drive input side part of the motor vehicle transmission 3 shifted to neutral is stored as a function of a current transmission temperature $T_{Getr}$, i.e. the transmission oil temperature. For the subsequent operation of the motor vehicle, the parameters stored in that manner can be retrieved to enable appropriate regulation of the motor vehicle transmission 3.

Accordingly, by virtue of the method according to the invention drag torques acting on the input side can be determined regardless of the type of transmission concerned.

INDEXES

1 Drive engine
2 Separator clutch
3 Motor vehicle transmission
4 Transmission control unit
5 Engine control unit
$M_{Getr}$ Drag torque of the drive input side part of the transmission in neutral
$M_{Kup1}$ Drag torque of the clutch
$M_{Kup2}$ Drag torque of the clutch
$n_{Mot}$ Engine rotational speed
$n_{Getr}$ Transmission input rotational speed
$\dot{n}_{Getr, I}$ Gradient of the transmission input rotational speed
$\dot{n}_{Getr, II}$ Gradient of the transmission input rotational speed
$\alpha$ Road inclination
$T_{Getr}$ Transmission temperature

The invention claimed is:

1. A method of determining at least one drag torque ($M_{Getr}$, $M_{Kup\ 1}$) acting on an input side of an automatic motor vehicle transmission (3) of a motor vehicle such that, prior the determination, a separator clutch (2) located between the motor vehicle transmission (3) and a drive engine (1) is disengaged (S4), the method comprising the steps of:
 shifting the motor vehicle transmission (3) into neutral (S2) once the motor vehicle is stopped,
 initiating deactivation of the drive engine and disengaging the separator clutch after the drive engine (1) is deactivated,
 calculating, via a processor of a transmission control unit, the at least one drag torque ($M_{Getr}$, $M_{Kup\ 1}$)
 determining (S5), via the processor of the transmission control unit, a first gradient ($\dot{n}_{Getr, I}$) of a transmission input rotational speed ($n_{Getr}$), before an engine rotational speed ($n_{Mot}$) of the drive engine (1) falls below the transmission input rotational speed,
 determining (S7), via the processor of the transmission control unit, a second gradient ($\dot{n}_{Getr, II}$) of the transmission input rotational speed ($n_{Getr}$), after the engine rotational speed ($n_{Mot}$) falls below the transmission input rotational speed ($n_{Getr}$),
 determining (S9), as the drag torque, at least one of a drag torque ($M_{Kup\ 1}$) of the separator clutch (2) and a drag torque ($M_{Getr}$) of a drive input side part of the motor vehicle transmission (3) shifted to neutral, and
 recording the drag torque ($M_{Kup\ 1}$), determined for the separator clutch (2), as a function of a current road inclination ($\alpha$).

2. The method according to claim 1, further comprising the step of recording the drag torque ($M_{Getr}$), determined for the drive input side part of the motor vehicle transmission (3) shifted to neutral, as a function of a current transmission temperature ($T_{Getr}$).

3. The method according to claim 1, further comprising the step of carrying out the determination while the motor vehicle is parked.

4. The method according to claim 3, further comprising the step of storing the determined at least one drag torque ($M_{Getr}$, $M_{Kup\ 1}$) in a memory.

5. A method of determining at least one drag torque ($M_{Getr}$, $M_{Kup\ 1}$) acting on an input side of an automatic motor vehicle transmission (3) of a motor vehicle such that, prior the determination, a separator clutch (2) located between the motor vehicle transmission (3) and a drive engine (1) is disengaged (S4), the method comprising the steps of:
 shifting the motor vehicle transmission (3) into neutral (S2) once the motor vehicle is stopped;
 initiating deactivation of the drive engine and disengaging the separator clutch after the drive engine (1) is deactivated;
 calculating, via a processor of a transmission control unit, the at least one drag torque ($M_{Getr}$, $M_{Kup\ 1}$);
 determining (S5), via the processor of the transmission control unit, a first gradient ($\dot{n}_{Getr, I}$) of a transmission input rotational speed ($n_{Getr}$), before an engine rotational speed ($n_{Mot}$) of the drive engine (1) falls below the transmission input rotational speed;
 determining (S7), via the processor of the transmission control unit, a second gradient ($\dot{n}_{Getr, II}$) of the transmission input rotational speed ($n_{Getr}$), after the engine rotational speed ($n_{Mot}$) falls below the transmission input rotational speed ($n_{Getr}$);
 initiating the method with a routine of a computer program stored in a memory of a control unit of the motor vehicle only once the motor vehicle completely stops;
 ensuring that deactivation of the drive engine is initialed;
 monitoring the engine rotational speed and the transmission input rotational speed after disengagement of the separator clutch;
 calculating at least one of a drag torque of the separator clutch and a drag torque of a drive input side part of the motor vehicle transmission shifted to neutral during deactivation of the drive engine;
 calculating, with the control unit, at least one of the drag torque of the separator clutch and the drag torque of the drive input side part of the motor vehicle transmission shifted to neutral, during deactivation of the drive engine, based on a mass moment of inertia of the drive input side part of the motor vehicle transmission shifted to neutral, which is stored in the control unit; and
 recording, in a memory of the control unit, the drag torque of the separator clutch as a function of a current road inclination.

6. The method according to claim 5, further comprising the step of recording, in a memory of the control unit, the drag torque of the drive input side part of the motor vehicle transmission shifted to neutral as a function of a current transmission temperature.

\* \* \* \* \*